United States Patent [19]
Bhagavatula

[11] Patent Number: 5,649,044
[45] Date of Patent: Jul. 15, 1997

[54] DISPERSION SHIFTED OPTICAL WAVEGUIDE

[75] Inventor: Venkata A. Bhagavatula, Big Flats, N.Y.

[73] Assignee: Corning Incorporated, Cornnig, N.Y.

[21] Appl. No.: 562,231

[22] Filed: Nov. 21, 1995

[51] Int. Cl.⁶ ............................................. G02B 6/18
[52] U.S. Cl. ...................... 385/124; 385/123; 385/127
[58] Field of Search ................................ 385/123, 124, 385/126, 127, 141, 142

[56] References Cited

U.S. PATENT DOCUMENTS

| | | | |
|---|---|---|---|
| 4,699,464 | 10/1987 | Cohen et al. | 385/123 |
| 4,822,399 | 4/1989 | Kanamori et al. | 65/398 |
| 4,877,304 | 10/1989 | Bhagavatula | 385/124 |
| 5,361,319 | 11/1994 | Antos et al. | 385/123 |
| 5,504,829 | 4/1996 | Evans et al. | 385/123 |
| 5,555,340 | 9/1996 | Onishi et al. | 385/127 |

*Primary Examiner*—John D. Lee
*Attorney, Agent, or Firm*—William J. Chervenak

[57] ABSTRACT

A novel optical waveguide fiber having low total dispersion slope, relatively large mode field diameter, larger effective area, and a relatively simple core profile design is disclosed. The core refractive index profile comprises three segments. The adjustability of the height, width and location of the three core index profile segments, provides sufficient flexibility to meet a specification which calls for a dispersion shifted waveguide fiber capable of limiting four photon mixing or self phase modulation. The novel waveguide is characterized by a mode field diameter $\geq 7.5$ microns and a total dispersion slope $\leq 0.070$ ps/nm²-km.

15 Claims, 5 Drawing Sheets

DISPERSION SHIFTED OPTICAL WAVEGUIDE

BACKGROUND OF THE INVENTION

The invention is directed to a single mode optical waveguide fiber having a dispersion zero shifted to wavelengths near 1550 nm, larger effective area and low total dispersion slope. The novel waveguide fiber is a species of the genus of profiles disclosed and described in U.S. application Ser. No. 08/378,780 (abandoned).

The novel single mode waveguide design serves to maintain mode field diameter size to limit non-linear effects due to high signal power densities. In addition the novel waveguide fiber provides low attenuation and bend resistance using a simple refractive index profile design, thereby keeping manufacturing cost low. For certain of the profiles which fall within the scope of the invention, the normalized waveguide dispersion vs. wavelength curve is bimodal, thereby affording an additional characteristic which can be used in high performance telecommunications systems.

Telecommunication systems using high powered lasers, high data rate transmitters and receivers, and wavelength division multiplexing (WDM) technology require optical waveguide fiber having exceptionally low, but non-zero, total dispersion, and exceptionally low polarization mode dispersion (PMD). In addition, the waveguide fiber must have characteristics which essentially eliminate non-linear phenomena such as self phase modulation (SPM) and four wave mixing (FWM). The SPM can be limited by lowering power density. The FWM is controlled by operating in a wavelength range at which dispersion is non-zero.

A further requirement is that the optical waveguide be compatible with systems incorporating optical amplifiers.

To provide an optical waveguide having the characteristics required for these sophisticated systems, a variety of refractive index profiles have been modelled and tested. The compound core design, discussed in U.S. Pat. No. 4,715,679, Bhagavatula, offers the flexibility to meet the new system requirements while maintaining the basic requirements such as low attenuation, narrow geometry tolerances, acceptable bending resistance, and high tensile strength. Furthermore, certain of the compound core designs are relatively easy to manufacture, thereby providing enhanced optical waveguide performance without prohibitive cost increases.

A particular species of the core profile designs described in abandoned U.S. patent application Ser. No. 08/378,780 having unusual properties, has been discovered.

In telecommunications systems using wavelength division multiplexing, a preferred optical waveguide is one having a relatively flat total dispersion over the wavelength range of the multiplexed signals. For those systems which use optical amplifiers or otherwise make use of high signal power, non-linear effects such as four wave mixing and self phase modulation become system limiting factors.

Thus there is a need for an optical waveguide fiber which has a low total dispersion slope to facilitate wavelength division multiplexing, allows management of total dispersion to limit four wave mixing, and which maintains a relatively large mode field so that power per unit cross section of waveguide fiber is not too large, thereby limiting self phase modulation.

Furthermore, one wishes to maintain ease of manufacture and low manufacturing cost associated with simple refractive index profile waveguides, such as one having a step index.

DEFINITIONS

The radii of the regions of the core are defined in terms of the index of refraction. A particular region begins at the point where the refractive index characteristic of that region begins and ends at the last point where the refractive index is characteristic of that region. Radius will have this definition unless otherwise noted in the text.

The term, %$\Delta$, represents a relative measure of refractive index difference defined by the equation, $$\%\Delta = 100 \times (n_r^2 - n_c^2)/2n_r^2,$$

where $n_r$ is the maximum refractive index in a given core region and $n_c$ is the refractive index in the cladding region.

The term alpha profile refers to a refractive index profile, expressed in terms of % $\Delta(r)$, which follows the equation, $$\%\Delta(r) = \%\Delta(r_o)(1 - [(r - r_o)/(r_1 - r_o)]^{alpha}),$$

where r is in the range $r_o \leq r \leq r_1$, %$\Delta$ is defined above, and alpha is an exponent which defines the profile shape.

The effective area is $$A_{eff} = 2\pi (\int E^2 r\, dr)^2 / (\int E^4 r\, dr),$$

where the integration limits are 0 to $\infty$, and E is the electric field associated with the propagated light.

Normalized waveguide dispersion is defined in accord with '679, Bhagavatula, as V $d^2$ (bV)/$dV^2$.

SUMMARY OF THE INVENTION

The novel waveguide fiber disclosed herein meets the need for a high performance fiber having a low dispersion slope and a larger effective area, i.e., an $A_{eff} > 60$ microns$^2$. In addition, the novel index profile design can be tailored to provide a bimodal curve of normalized waveguide dispersion vs. $\lambda/\lambda_c$. Bimodal is used to describe a curve comprising a first portion having a first slope and a second portion having a second slope. In the instant case one portion of the normalized waveguide dispersion curve is flat and thus defines a wavelength interval over which $\lambda_o$ and the total dispersion are insensitive to manufacturing variation. Another portion of the curve has a steeper slope, typically a slope magnitude greater that about 2 and thus provides a wavelength interval over which small changes in waveguide fiber geometry or index profile produce a large change in $\lambda_o$ and thus, total dispersion. This latter response to waveguide geometry or index profile is ideal for toggling total dispersion between positive and negative values, thereby managing the total dispersion of a fiber length. Management of total dispersion can mean that total dispersion for the entire fiber length is small while the dispersion over any significant length segment of the fiber is non-zero. The non-linear four wave mixing effect is thus essentially eliminated.

A first aspect of the novel waveguide fiber, which addresses the deficiencies and exhibits the beneficial properties noted above, is a single mode waveguide fiber having a dispersion zero wavelength in the range of about 1500 nm to 1600 nm, i.e., the waveguide is dispersion shifted. The refractive index profile of the waveguide fiber core has three segments:

a central segment of radius $A_1$, where the radius is measured from the waveguide centerline, having an alpha profile wherein alpha=1, and a maximum refractive index $n_1$ and index difference $\Delta_1\%$;

a second segment having a first point immediately after $A_1$ and a last point at radius $A_2$, and a maximum refractive index $n_2$ and index difference $\Delta_2\%$; and, a third segment having a first point immediately after $A_2$ and a last point at radius A, and a maximum refractive index $n_3$ and index difference $\Delta_3\%$.

The relations among these parameters are:

$n_1 > n_3 > n_2 \geq n_c$;

$A_1/A$ is in the range 0.4 to 0.6;

$A_2/A$ is in the range of about 0.78 to 0.88; and, $\Delta_3\%/\Delta_1\%$ is in the range of about 0.16 to 0.39.

These relationships produce the waveguide fiber characteristics, zero dispersion wavelength in the range 1520 nm to 1600 nm and total dispersion slope $\leq 0.085$ ps/nm$^2$-km.

An embodiment of this first aspect has:

$A_1$ in the range 3.25 microns to 3.50 microns;

$A_2$ in the range 5.55 microns to 6.05 microns; and,

A in the range 6.5 microns to 7.0 microns. The ratio $\Delta_3\%/\Delta_1\%$ is about 0.165 and $\Delta_1\%$ is 0.9 to 1.0%. This embodiment has the characteristics, zero dispersion wavelength in the range 1530 nm to 1550 nm, total dispersion slope $\leq 0.07$ ps/nm$^2$-km, and mode field diameter $\geq 8.4$ microns.

In a sub-species of this embodiment, the second core segment has a flat index profile and $n_2$ is about equal to $n_c$. The third core segment has a trapezoidal shape with a top portion essentially flat.

Another embodiment of this first aspect has:

$A_1$ in the range 3.25 microns to 3.75 microns;

$A_2$ in the range 5.1 microns to 6 microns; and,

A in the range of about 6.5 to 7.5 microns. The ratio $\Delta_3\%/\Delta_1\%$ is about 0.18 and $\Delta_1\%$ is about 0.9 to 1% to yield the waveguide properties, zero dispersion wavelength in the range 1535 nm to 1585 nm, total dispersion slope $\leq 0.065$ ps/nm$^2$-km, mode field diameter $\geq 7.5$ microns, and a bimodal normalized waveguide dispersion slope.

In a sub-species of this embodiment, the first core segment has a central portion in the shape of an inverted cone whose base radius is no greater than about 1.5. Also near the end of the first core index profile segment, the slope of the triangular alpha profile is decreased. These two central core segment characteristics are representative of the diffusion or leaching of dopant out of the waveguide preform during manufacture. For most purposes this diffusion phenomenon does not materially affect the waveguide performance. However, in cases where the diffusion does significantly alter waveguide properties, compensation for diffusion can be made in the preform manufacturing step. Thus, their presence places the modelled in better conformity with an actual refractive index profile. The second core segment has a flat index profile and $n_2$ is essentially equal to $n_c$.

The bimodal nature of the normalized waveguide dispersion of this sub-species may be described in terms of the waveguide fiber cut off wavelength $\lambda_c$ and the operating or signal wavelength $\lambda$. In particular, the normalized waveguide dispersion curve is substantially flat when, $0.68 \leq \lambda_c/\lambda \leq 0.8$, and is greater than about 2 for $\lambda_c/\lambda > 0.8$.

A second aspect of the invention, in analogy with the first aspect, may be defined as a waveguide fiber having a three segment core, wherein the central segment has a step index profile. Keeping analogous definition of terms, $n_1 > n_3 > n_2 \geq n_c$, $A_1/A$ is about 0.3, $A_2/A$ is about 0.85, and $\Delta_3\%/\Delta_1\%$ is about 0.39. The novel waveguide fiber thus described has a zero dispersion wavelength in the range 1520 nm to 1600 nm, a total dispersion slope $\leq 0.070$ ps/nm$^2$-km.

An embodiment of this second aspect has:

$A_1$ in the range 2.25 microns to 2.55 microns;

$A_2$ in the range 6.35 microns to 7.4 microns; and,

A in the range of about 7.5 microns to 8.5 microns. The ratio $\Delta_3\%/\Delta_1\%$ is about 0.39 and $\Delta_1\%$ is about 0.6%. The waveguide fiber of this embodiment has a zero dispersion wavelength in the range 1525 nm to 1600 nm, a total dispersion slope $\leq 0.07$ ps/nm$^2$-km, and a mode field diameter $\geq 8.0$ microns.

A sub-species of this embodiment has a second segment index profile which is substantially flat and essentially equal to $n_c$. The refractive index profile of the third core segment is trapezoidal. The normalized waveguide dispersion curve is bimodal as defined by the following limitations on the ratio of cut off wavelength to signal wavelength. The normalized waveguide dispersion curve is substantially flat for $0.72 \leq \lambda_c/\lambda \leq 0.80$, and has a slope greater than about 2 for $\lambda_c/\lambda > 0.80$.

It will be understood that small variations in the refractive index profiles described above will not materially affect the waveguide fiber properties or performance. Furthermore, the concept of equivalent refractive index is known in the art. Equivalent index profiles is one which are essentially interchangeable in a waveguide fiber.

The novel family of refractive index profiles herein described includes equivalent profiles and alternate profiles which vary only slightly from a described profile. For example, a step segment may have rounded corners, or sloped sides, or a concave or convex top portion. Also, the phenomenon of dopant diffusion, which occurs in some waveguide preform fabrication methods, usually does not significantly affect the properties or performance of the waveguide fiber. However, in cases where the diffusion does significantly alter waveguide properties, compensation for diffusion can be made in the preform manufacturing step. Waveguide core percent $\Delta$'s or geometry ratios may be tuned, i.e. adjusted, to achieve the desired properties and performance in the waveguide fiber.

BRIEF DESCRIPTION OF THE DRAWINGS

FIG. 2b is a chart of normalized waveguide dispersion vs. $\lambda_c/\lambda$ which relates to the refractive index profile shown in FIG. 2a.

FIG. 3b is a chart of normalized waveguide dispersion vs. $\lambda_c/\lambda$ which relates to the refractive index profile shown in FIG. 3a.

DETAILED DESCRIPTION OF THE INVENTION

The step index single mode optical waveguide has become an industry standard because of its high bandwidth, low attenuation, and simplicity of refractive index profile design. This waveguide fiber is particularly attractive to the telecommunications industry because the simplicity of index profile design translates into lower cost for the supplier and installer.

However, as demand for higher performance waveguide has increased, an index profile design having greater flexibility was needed. The novel segmented core disclosed herein is a species of the genus of refractive index profile disclosed in U.S. Pat. No. 4,715,679, Bhagavatula and further detailed in U.S. patent application Ser. Nos. 08/378, 780 (abandoned) and 08/323,795 (U.S. Pat. No. 5,483,612). The three segment core design, which is the subject of this application, has sufficient flexibility to meet a broad range of high performance telecommunication system requirements.

Because the number of possible segmented core refractive index profiles, as disclosed in the '679 patent, is essentially infinite, it is convenient to study particular index profile species using a model to calculate waveguide fiber performance based on core refractive index and core geometry parameters.

For the subject invention the waveguide fiber functional requirements included low dispersion slope, operation in the 1550 nm attenuation window, and an effective area at 1550 nm greater than about 60 microns$^2$. Mode field diameter is preferably held constant or increased relative to standard dispersion shifted waveguide fiber.

In searching for refractive index profiles which fit these requirements, an additional benefit was discovered. For certain of the novel three segment profiles, the normalized waveguide dispersion, defined in the '679, Bhagavatula patent as $V d^2(Vb)/dV^2$, plotted against the ratio $\lambda_c/\lambda$, where $\lambda_c$ is cut off wavelength and $\lambda$ is the signal wavelength, exhibits a bimodal slope. A first portion of the curve is substantially flat. Thus, zero dispersion wavelength and cut off wavelength are relatively insensitive to changes in waveguide fiber geometry, such as core radius. The manufacturing tolerances are therefore relaxed and percent good product selected will increase.

A second portion of the normalized waveguide dispersion curve exhibits a slope greater than about 2. For this portion of the curve, zero dispersion wavelength and cut off wavelength can have widely varying values, depending on waveguide fiber geometry. A dispersion managed waveguide could then be more readily made, because total dispersion could be more easily made to toggle between positive and negative values. In this way, the total dispersion of the waveguide could be made small over the full length of the fiber, while in any sub-length along the waveguide fiber, the total dispersion would be non-zero. Four wave mixing could therefore be controlled without a large penalty in total dispersion.

Figure 1:
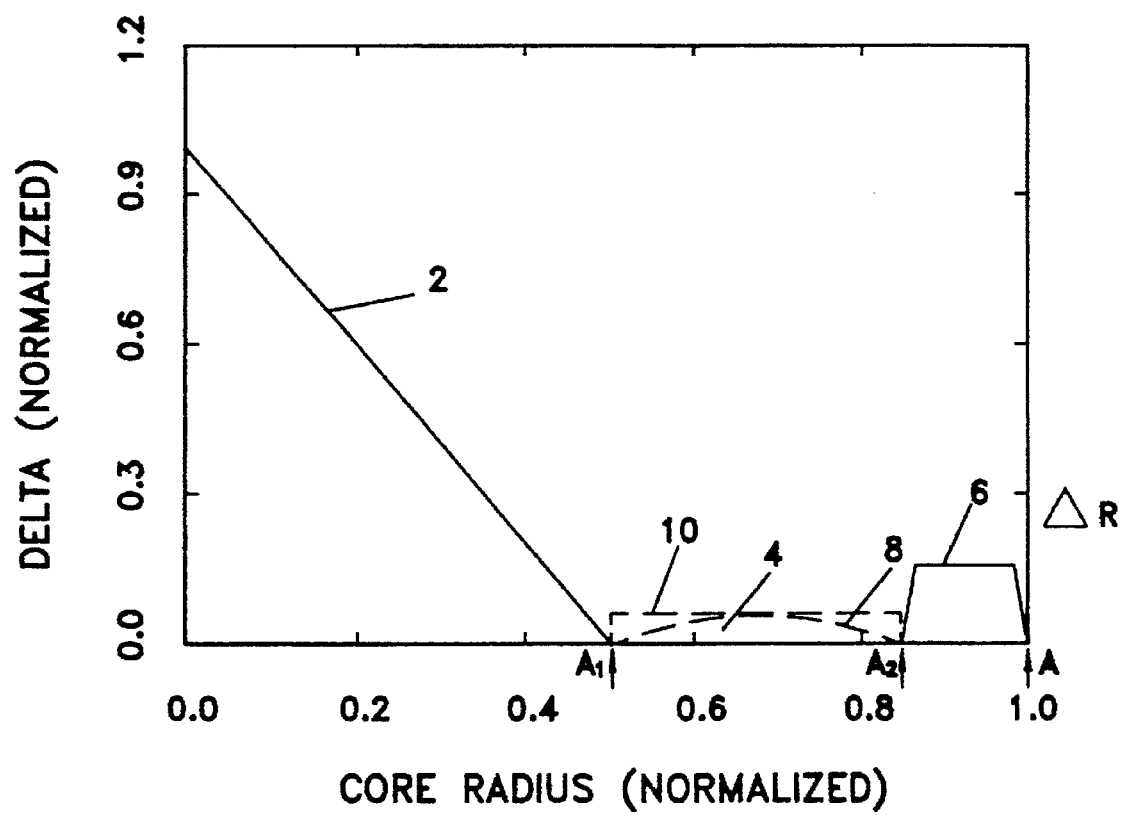
FIG. 1 is an illustration of the a three segment core having a triangular, i.e., alpha=1, central profile.

An optical waveguide having three segments is shown in FIG. 1. Note that the definitions of radii $A_1$, $A_2$, and A are shown in FIG. 1. The central segment 2 is an alpha profile wherein alpha is one, i.e., a triangular shaped index profile. The second segment 4 is shown with several possible alternatives including a flat profile with index equal to $n_c$, a step index 10, and a more generally curved index 8. The index profile is chosen such that $n_1 > n_3 > n_2 \geq n_c$, where the refractive index subscript corresponds to the segment number. The third segment is shown as trapezoid 6. It is understood that small modifications of index profile 6 may be made without materially affecting the waveguide function. For example, the top to the trapezoid could be slanted or curved.

EXAMPLE 1

Three Segment Profile, Alpha=1

A family of waveguides having the profile shape illustrated in FIG. 1 were modelled in search of low dispersion slope and second window zero dispersion wavelength, $\lambda_o$. Appropriate index profile parameters were found to be: $\sim A_1/A \sim 0.5$; $A_2/A \sim 0.86$; $A_3\%/A_1\% \sim 0.165$. Table 1 shows the modelled characteristics of two waveguides.

TABLE 1

| A microns | $\Delta_1$ nm | $\lambda_c$ nm | $\lambda_o$ nm | Slope ps/nm$^2$-km | Mode field microns |
|---|---|---|---|---|---|
| 7.0 | 0.9 | ~1080 | ~1530 | 0.070 | ~8.4 |
| 6.5 | 0.9 | ~1000 | ~1550 | 0.065 | ~8.7 |

Table 1. shows dispersion shifted waveguide fibers having very low dispersion slope and large mode field diameter. $A_{eff}$ is greater than 70 microns$^2$ for these waveguides.

Another waveguide fiber, within the scope of this example, has $A_1/A=0.46$, $A_2/A=0.84$–$0.85$, $\Delta_3\%/\Delta_1\%=0.39$, $A=7.1$–$7.2$, and $\Delta_1\% \sim 0.9\%$. In this case, dispersion slope is slightly higher at about 0.085 ps/nm$^2$-km but $A_{eff}$ is increased to values in the range of about 75 to 80 microns$^2$.

Figure 2A:
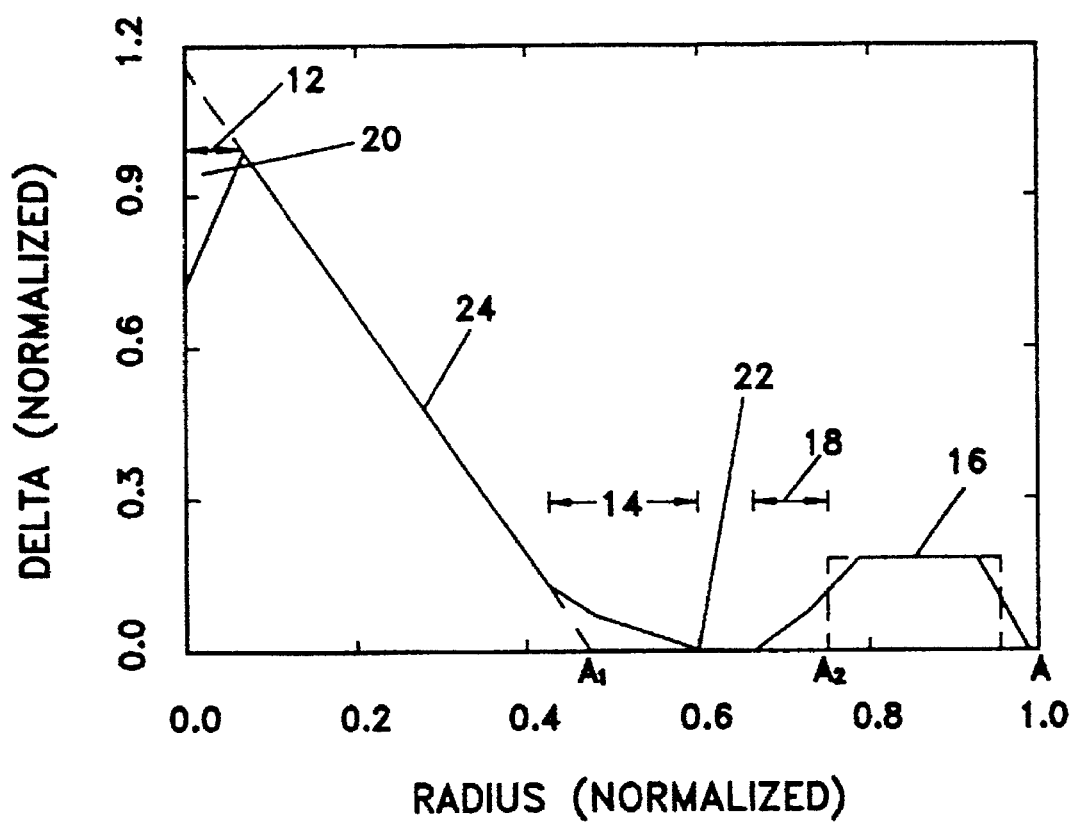
FIG. 2a is an illustration of a three segment profile wherein the central segment has a center portion having the shape of an inverted cone and an end portion having a slope magnitude less than 1.

An embodiment similar to that of FIG. 1 is illustrated in FIG. 2a. In this case, the modelled index profile has been modified to better reflect actual manufacturing conditions. Some waveguide fiber preform manufacturing techniques require high temperature treatment of a preform while it is still in soot form as distinguished from a preform which has been consolidated into a glass. During such a process step it is not unusual for dopant ions to be leached out of the glass soot or to diffuse through the glass soot.

The result of such leaching or diffusion may be represented by the refractive index profile of FIG. 2a. The inverted cone region 20 on centerline may be due to dopant leaching out of the soot. The base radius of the cone 12 is usually no greater than about 1.5 microns. Index profile portions 14 and 18 represent dopant which has diffused into region 22 from the adjacent index profile segments which have a higher dopant concentration. Thus, the alpha=1 profile portion 24 has a tapered portion 14, and trapezoidal index profile 16 has a broadened base and less steep side slopes.

EXAMPLE 2

Three Segment, Alpha=1, Dopant Diffusion

A three segment optical waveguide fiber was modelled using the profile shape illustrated in FIG. 2a. The radial locations of $A_1$, $A_2$, and A are shown on the horizontal axis of FIG. 2a. The index profile parameters used in the model calculation were: $A_1/A \sim 0.50$; $A2/A \sim 0.79$; and, $\Delta_3\%/\Delta_1\% \sim 0.18$. Results are shown in Table 2.

TABLE 2

| A microns | $\Delta_1$ nm | $\lambda_c$ nm | $\lambda_o$ nm | Slope ps/nm$^2$-km | Mode field microns |
|---|---|---|---|---|---|
| 6.5 | 1.0 | 1250 | 1585 | 0.065 | 7.8 |
| 7.0 | 1.0 | 1350 | 1565 | 0.063 | 7.5 |
| 7.5 | 1.0 | 1445 | 1535 | 0.060 | — |

The model results show very low total dispersion slope and the capability to toggle between $\lambda_o$'s above and below 1550 nm. This latter feature makes the design suitable for use in dispersion managed waveguides as described above. The mode field diameters are adequate for moderate signal power densities.

Figure 2B:
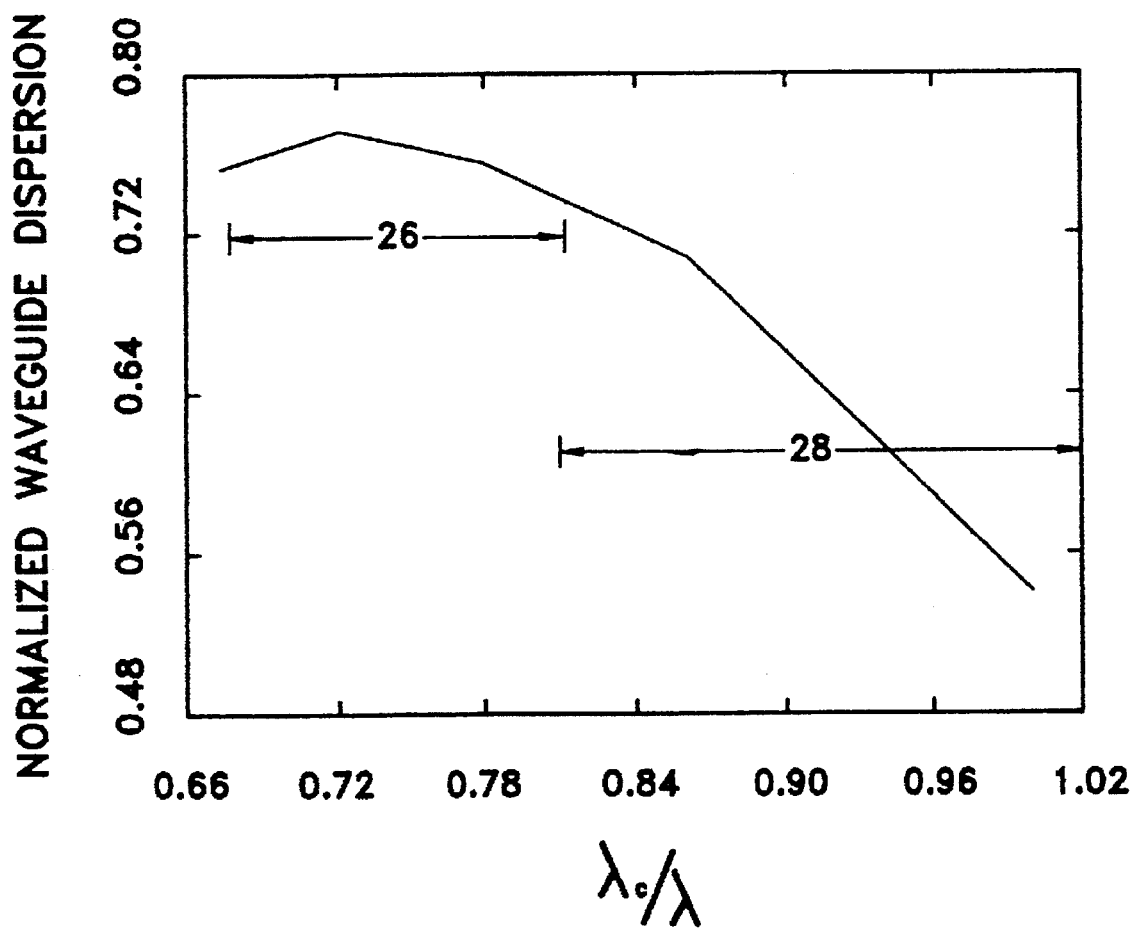

The normalized waveguide dispersion charted vs. $\lambda_c/\lambda$, which corresponds to the index profiles of example 2, is shown in FIG. 2b. The flat portion of the curve 26 is the design region wherein $\lambda_o$ is insensitive to manufacturing variations in waveguide fiber geometry. The steeper portion of the curve 28 is the design region useful in manufacturing dispersion managed waveguide fiber.

Figure 3A:
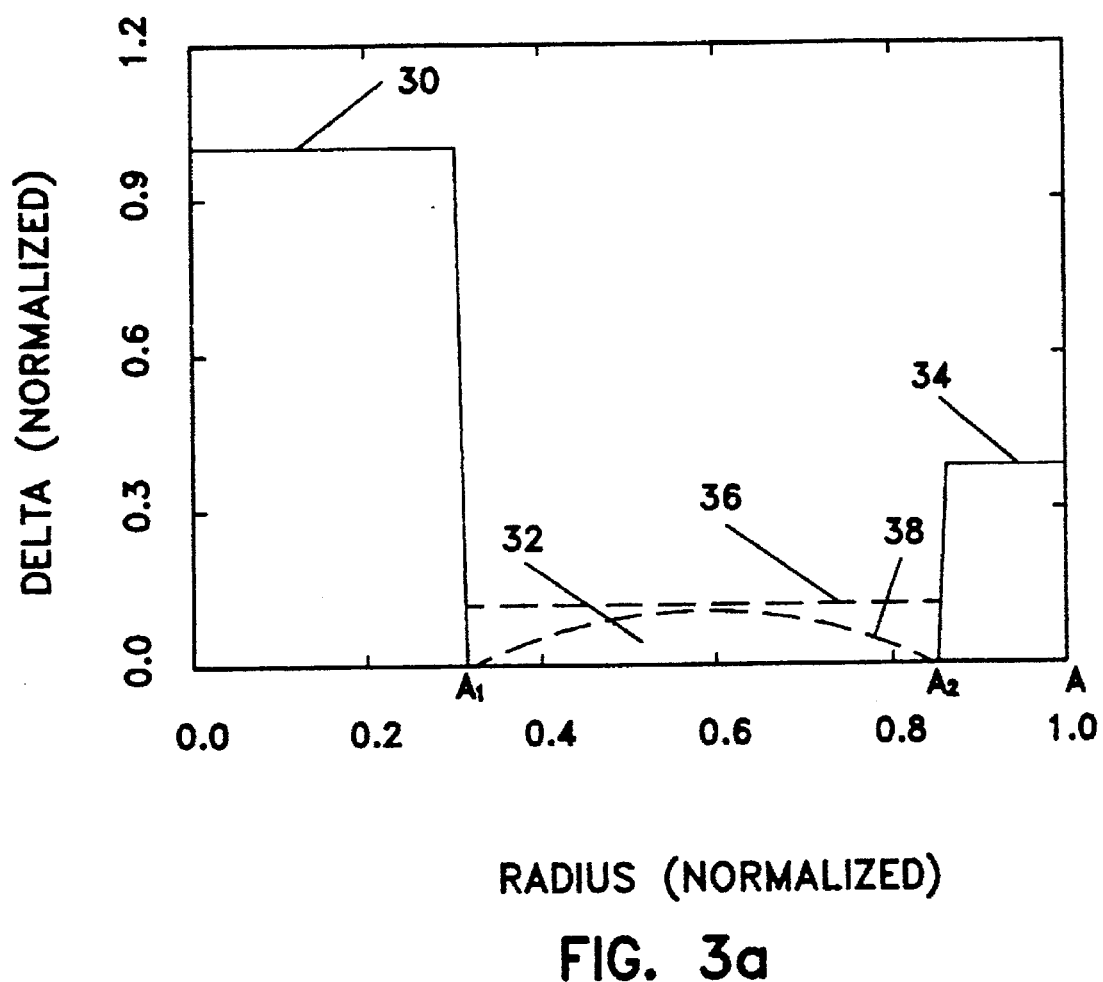
FIG. 3a is an illustration of a three segment profile having a step index profile as the central segment.

The embodiment of the invention shown in FIG. 3a is particularly simple in design and relatively easy to manufacture, thereby enabling a low cost manufacturing process. Central step index profile 30 is separated from the trapezoidal segment 34 by lower index segment 32. Step and curve segments 36 and 38 are shown as alternatives to the segment 32, which is essentially equal in refractive index to the clad layer.

EXAMPLE 3

Step Index

The index profile of FIG. 3a with the second segment taken to be index profile 32 was modelled using the parameters: $A_1/A \sim 0.3$; $A_2/A \sim 0.85$; and, $\Delta_3\%/\Delta_1\% \sim 0.39$. The model results are shown in Table 3.

TABLE 3

| A microns | $\Delta_1$ nm | $\lambda_c$ nm | $\lambda_o$ nm | Slope ps/nm²-km | Mode field microns |
|---|---|---|---|---|---|
| 7.5 | 0.6 | 1240 | 1579 | –0.070 | ~9.4 |
| 8.0 | 0.6 | 1323 | 1575 | –0.060 | ~8.4 |
| 8.5 | 0.6 | 1400 | 1526 | –0.053 | ~8.1 |

Note that the total dispersion slope is very low for the last two example waveguide fibers and the mode filed diameter is >8.0 microns. The exceptionally large mode field of the first example waveguide fiber is obtained while the total dispersion slope is only 0.070 ps/nm²-km.

One may also note from the examples that one may increase $A_{eff}$ at the expense of higher total dispersion slope. The particular application determines how one may choose to make this tradeoff of waveguide properties.

Figure 3B:
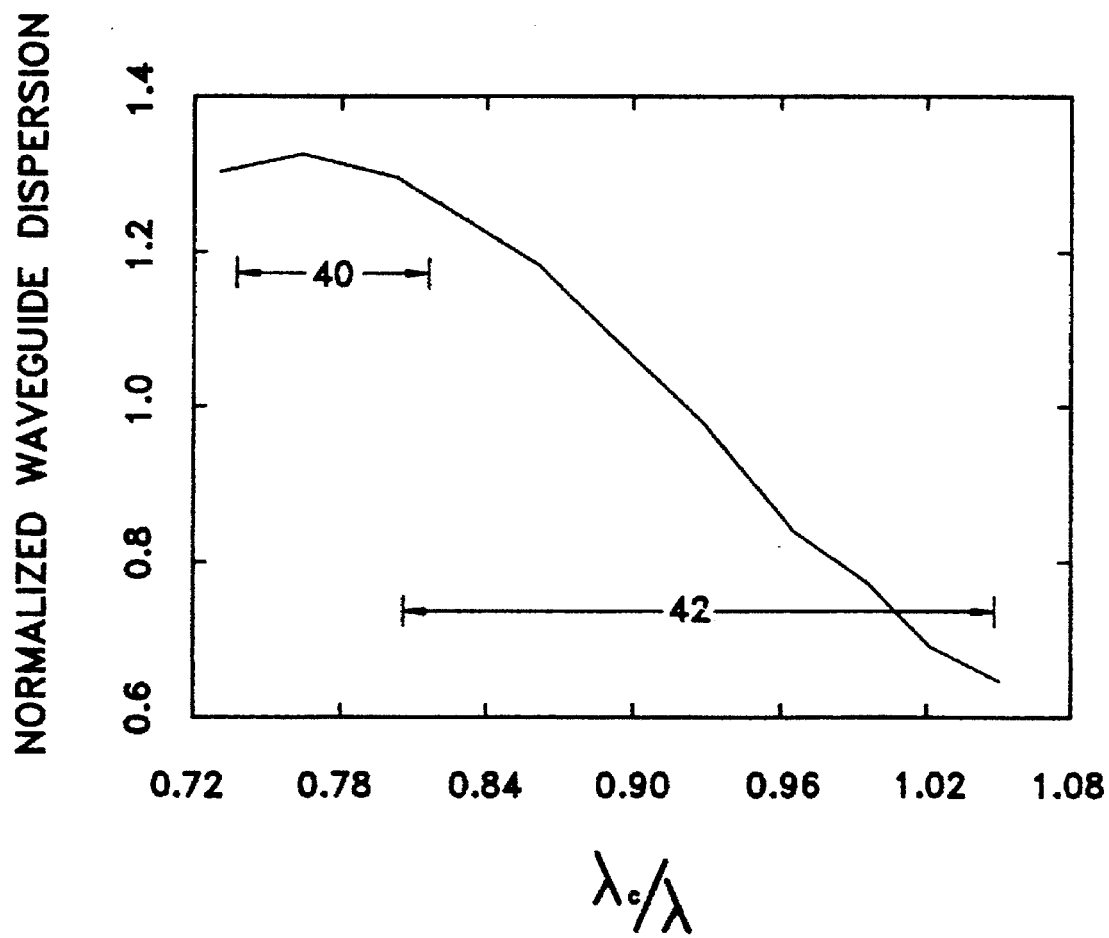

For this refractive index profile design there is an associated bimodal curve of normalized waveguide dispersion charted versus the ratio $\lambda_c/\lambda$. Referring to FIG. 3b, the curve is relatively flat for $\lambda_c/\lambda$ in the range of about 0.72 to 0.8. The steeper portion of the curve in general has a slope of magnitude greater than about 2 for $\lambda_c/\lambda$ greater than 0.8.

The invention thus provides a three segment core optical waveguide fiber which:

can be fabricated as a dispersion managed waveguide;

is simple in design and therefore low in manufacturing cost;

provides the very low total dispersion slope required for high bit rate systems which may use wavelength division multiplexing or have long regenerator spacing; and, maintains a high enough mode field diameter to limit non-linear optical effects, such as four photon mixing and self phase or cross phase modulation.

Although particular embodiments of the invention have herein been disclosed and described, the invention is nonetheless limited only by the following claims.

What is claimed is:

1. A dispersion shifted single mode optical waveguide fiber comprising:

a core region having a refractive index profile comprising three segments, a first segment, having a first point on the waveguide fiber centerline, a last point at radius $A_1$, a maximum refractive index $n_1$ and index difference $\Delta_1\%$, and an alpha profile, wherein alpha is one, a second segment, having a first point immediately after radius $A_1$, a last point at radius $A_2$, and a maximum refractive index $n_2$ and index difference $\Delta_2\%$, and, a third segment, having a first point immediately after radius $A_2$, a last point at radius A, and a maximum refractive index $n_3$ and index difference $\Delta_3\%$;

a clad layer surrounding said core region, said clad layer having a maximum refractive index $n_c$;

wherein, $n_1 > n_3 > n_2 \geq n_c$, $A_1/A$ is in the range of about 0.40 to 0.60, $A_2/A$ is in the range of about 0.78 to 0.88; and $\Delta_3\%/\Delta_1\%$ is in the range of about 0.16 to 0.39;

said single mode optical waveguide having a zero dispersion wavelength in the range 1520 nm to 1600 nm and a total dispersion slope $\leq 0.095$ ps/nm²-km.

2. The single mode optical waveguide fiber of claim 1, wherein $A_1$ is in the range 3.25 microns to 3.50 microns, $A_2$ is in the range 5.55 microns to 6.05 microns, A is in the range of about 6.5 microns to 7.0 microns, $\Delta_3\%/\Delta_1\%$ is about 0.165, and $\Delta_1\%$ is about 0.9 to 1.0%, thereby providing a zero dispersion wavelength in the range 1530 nm to 1550 nm, an $A_{eff}$ greater than about 60 microns², a total dispersion slope $\leq 0.070$ ps/nm²-km, and a mode field diameter $\geq 8.4$ microns.

3. The single mode optical waveguide fiber of claim 2 wherein said second segment has a flat profile and the refractive index $n_2$ is about equal to that of the clad layer, and said third segment has a trapezoidal refractive index profile.

4. The single mode optical waveguide fiber of claim 1 wherein $A_1$ is in the range 2.55 microns to 3.0 microns, $A_2$ is in the range 4.2 microns to 5.8 microns, A is in the range of about 5.0 microns to 6.9 microns, $\Delta_3\%/\Delta_1\%$ is in the range of 0.25 to 0.39, and $\Delta_1\%$ is about 0.9 to 1.0%, thereby providing a zero dispersion wavelength in the range 1530 nm to 1550 nm, a total dispersion slope $\leq 0.095$ ps/nm²-km, $A_{eff} \geq 75$ microns², and a mode field diameter $\geq 9.6$ microns.

5. The single mode optical waveguide fiber of claim 1, wherein $A_1$ is in the range 3.25 microns to 3.75 microns, $A_2$ is in the range 5.10 microns to 6 microns, A is in the range of about 6.5 microns to 7.5 microns, $\Delta_3\%/\Delta_1\%$ is about 0.18, and $\Delta_1\%$ is about 0.9 to 1.0%, thereby providing a zero dispersion wavelength in the range 1535 nm to 1585 nm, a total dispersion slope $\leq 0.065$ ps/nm²-km, a mode field diameter $\geq 7.5$ microns, and a bimodal normalized waveguide dispersion curve.

6. The single mode optical waveguide fiber of claim 5 wherein said first segment is further characterized by a central, hollow region in the shape of an inverted cone, the inverted cone having a base radius no greater than about 1.5 microns, and a profile portion near $A_1$ of slope less than that of the alpha profile having alpha equal to one, said second segment has a flat profile and the refractive index is about equal to that of the clad layer, and said third segment has a trapezoidal refractive index profile.

7. The single mode optical waveguide of claim 6 wherein said single mode optical waveguide is characterized by a normalized waveguide dispersion $\lambda_c/\lambda$ curve and has a cut off wavelength $\lambda_c$ and a signal wavelength $\lambda$, the normalized waveguide dispersion vs. $\lambda_c/\lambda$ curve having a slope substantially zero for $\lambda_c/\lambda$ in the range 0.68 to 0.8, and a slope of magnitude greater than about 2 for $\lambda_c/\lambda$ greater than 0.8.

8. A dispersion shifted single mode optical waveguide fiber comprising:

a core region having a refractive index profile comprising three segments, a first segment, having a first point on the waveguide fiber centerline, a last point at radius $A_1$, a maximum refractive index $n_1$ and index difference $\Delta_1\%$, and a step index profile, a second segment, having a first point immediately after radius $A_1$, a last point at radius $A_2$, and a maximum refractive index $n_2$ and index difference $\Delta_2\%$, and, a third segment, having a first point immediately after radius $A_2$, a last point at radius A, and a maximum refractive index $n_3$ and index difference $\Delta_3\%$;

a clad layer surrounding said core region, said clad layer having a maximum refractive index $n_c$;

wherein, $n_1 > n_3 > n_2 \geq n_c$, $A_1/A$ is about 0.30, $A_2/A$ is about 0.85, and $\Delta_3\%/\Delta_1$ is about 0.39;

said single mode optical waveguide having a zero dispersion wavelength in the range 1520 nm to 1600 nm and a total dispersion slope $\leq 0.070$ ps/nm²-km.

9. The single mode optical waveguide fiber of claim 8, wherein $A_1$ is in the range 2.25 microns to 2.55 microns, $A_2$ is in the range 6.35 microns to 7.4 microns, A is in the range of about 7.5 microns to 8.5 microns, $\Delta_3\%/\Delta_1\%$ is about 0.39, and $\Delta_1\%$ is about 0.6, thereby providing a zero dispersion wavelength in the range 1525 nm to 1600 nm, an $A_{eff}$ greater than about 60 microns², a total dispersion slope $\leq 0.07$ ps/nm²-km, and a mode field diameter $\geq 8.0$ microns.

10. The single mode optical waveguide fiber of claim 9 wherein said second segment has a flat profile and the refractive index is about equal to that of the clad layer, and said third segment has a trapezoidal refractive index profile.

11. The single mode optical waveguide of claim 10 wherein said single mode optical waveguide is characterized by a normalized waveguide dispersion vs. $\lambda_c/\lambda$ curve and has a cut off wavelength $\lambda_c$ and a signal wavelength $\lambda$, the normalized waveguide dispersion curve characteristic of said waveguide having a slope substantially zero for $\lambda_c/\lambda$ in the range 0.72 to 0.8, and a slope of magnitude greater than about 2 for $\lambda_c/\lambda$ greater than 0.8.

12. A single mode optical waveguide fiber comprising:

a core region having a refractive index profile comprising three segments, a first segment, having a first point on the waveguide fiber centerline, a last point at radius $A_1$, a maximum refractive index $n_1$ and difference $\Delta_1\%$, and an alpha index profile wherein alpha is one, said first segment further having a centerline index profile in the shape of an inverted cone, the base of the cone having a radius no greater than about 1.5 microns, a second segment, having a first point immediately after radius $A_1$, a last point at radius $A_2$l, and a maximum refractive index $n_2$ and index difference $\Delta_2\%$, and, a third segment, having a first point immediately after radius $A_2$, a last point at radius A, and a maximum refractive index $n_3$ and index difference $\Delta_3\%$;

a clad layer surrounding said core region, said clad layer having a maximum refractive index $n_c$;

wherein, $n_1 > n_3 > n_2 \geq n_c$, $A_1/A$ is about 0.50, $A_2/A$ is about 0.79, A is in the range of about 6.5 microns to 7.5 microns, $\Delta_3\%/\Delta_1$ is about 0.18, and $\Delta_1\%$ is about 1%;

said single mode optical waveguide having a normalized waveguide dispersion having a first and a second section, said first section having a slope near zero and said second section having a slope of magnitude greater than about 2.

13. The single mode optical waveguide fiber of claim 12, wherein said optical waveguide fiber has a zero dispersion wavelength in the range 1535 nm to 1585 nm, a mode field diameter $\geq 7.5$ microns, a normalized waveguide dispersion slope near zero for operating wavelengths defined by $0.68 \leq \lambda_c/\lambda \leq 0.80$, and a normalized waveguide dispersion slope no less that about 2 for $\lambda_c/\lambda \geq 0.8$, wherein said first segment is further characterized by a profile portion near $A_1$ having slope less than that of the alpha profile, have alpha equal to one, said second segment has a flat profile and the refractive index is about equal to that of the clad layer, and said third segment has a trapezoidal refractive index profile.

14. A single mode optical waveguide fiber comprising:

a core region having a refractive index profile comprising three segments, a first segment, having a first point on the waveguide fiber centerline, a last point at radius $A_1$, a maximum refractive index $n_1$ and index difference $\Delta_1\%$, and a step index profile, a second segment, having a first point immediately after radius $A_1$, a last point at radius $A_2$, and a maximum refractive index $n_2$ and index difference $\Delta_2\%$, and, a third segment, having a first point immediately after radius $A_2$, a last point at radius A, and a maximum refractive index $n_3$ and index difference $\Delta_3\%$;

a clad layer surrounding said core region, said clad layer having a maximum refractive index $n_c$;

wherein, $n_1 > n_3 > n_2 \geq n_c$, $A_1/A$ is about 0.30, $A_2/A$ is about 0.85, A is in the range of about 6.5 microns to 7.5 microns, $\Delta_3\%/\Delta_1$ is about 0.39, and $\Delta_1\%$ is about 0.60%;

said single mode optical waveguide having a normalized waveguide dispersion charted versus $\lambda_c/\lambda$ in which the waveguide dispersion curve has a first and a second section, said first section having a slope near zero and said second section having a slope of magnitude greater than about 2.

15. The single mode optical waveguide fiber of claim 14, wherein said waveguide is characterized by a zero dispersion wavelength in the range 1525 nm to 1600 nm, a mode field diameter $\geq 8.0$ microns, and a normalized waveguide dispersion slope near zero for operating wavelengths defined by $0.72 \leq \lambda_c/\lambda \leq 0.80$, and a normalized waveguide dispersion slope no less that about 2 for $\lambda_c/\lambda \geq 0.8$, wherein said second segment has a flat profile and the refractive index is about equal to that of the clad layer, and said third segment has a trapezoidal refractive index profile.

* * * * *